United States Patent [19]

Blodgett, Jr.

[11] Patent Number: 5,332,276
[45] Date of Patent: Jul. 26, 1994

[54] CABLE-DRIVEN EXTENSION MECHANISM FOR TRAILER SLIDE-OUT

[75] Inventor: Raymond W. Blodgett, Jr., Norco, Calif.

[73] Assignee: RBW Industries, Inc., Corona, Calif.

[21] Appl. No.: 839,595

[22] Filed: Feb. 21, 1992

[51] Int. Cl.⁵ .............................................. B60R 27/00
[52] U.S. Cl. .................................... 296/26; 296/171; 296/175
[58] Field of Search .................. 296/26, 27, 170, 171, 296/172, 173, 175, 176, 165

[56] References Cited

U.S. PATENT DOCUMENTS

| | | | |
|---|---|---|---|
| 1,471,549 | 10/1923 | Clement . | |
| 1,763,044 | 6/1930 | Heath . | |
| 2,147,892 | 2/1939 | Gray | 20/2 |
| 2,323,106 | 6/1943 | Whiteman | 20/2 |
| 2,581,192 | 1/1952 | La Fleur | 20/2 |
| 2,842,972 | 7/1958 | Houdart | 74/91 |
| 2,857,197 | 10/1958 | Hogg | 296/37 |
| 2,902,312 | 9/1959 | Ferrera | 296/23 |
| 3,482,716 | 12/1969 | Leadley | 214/75 |
| 3,556,249 | 1/1971 | Jackson | 182/16 |
| 3,672,238 | 6/1972 | Young et al. | 74/89.2 |
| 4,050,595 | 9/1977 | Bussard | 214/84 |
| 4,192,544 | 3/1980 | Patterson | 296/165 |
| 4,270,791 | 6/1981 | Tann | 296/171 |
| 4,557,518 | 12/1985 | Maclean et al. | 296/156 |
| 5,090,749 | 2/1992 | Lee | 296/26 X |

FOREIGN PATENT DOCUMENTS 9086 of 1841 United Kingdom ................ 296/26

Primary Examiner—Joseph D. Pape
Attorney, Agent, or Firm—Klein & Szekeres

[57] ABSTRACT

Apparatus for selectively extending and withdrawing a trailer slide-out portion includes first and second rails, each slidably supported in a channel mounted underneath the trailer body. The outer ends of the rails are attached to the underside of the slide-out portion. A sheave driven by a reversible motor is mounted between the channels. First and second cables are wrapped around the sheave, the first cable having its ends attached to the first rail, and the second cable having its ends attached to the second rail. A pulley assembly supports each of the cables as it passes from the sheave to its respective rail. The cables, in conjunction with the pulley assemblies, translate the rotation of the sheave into longitudinal motion of the rails through the channels. Thus, sheave rotation in a first direction causes the cables to pull the rails outwardly, extending the slide-out, while sheave rotation in the opposite direction causes the cables to pull the rails inwardly, withdrawing the slide-out. A slack-compensation attachment device attaches each of the cables to its respective rail, whereby slack resulting from cable stretching is taken up. A shaft is provided, having a first end coupled to the sheave and a second end engageable by a hand crank, for allowing manual rotation of the sheave.

35 Claims, 2 Drawing Sheets

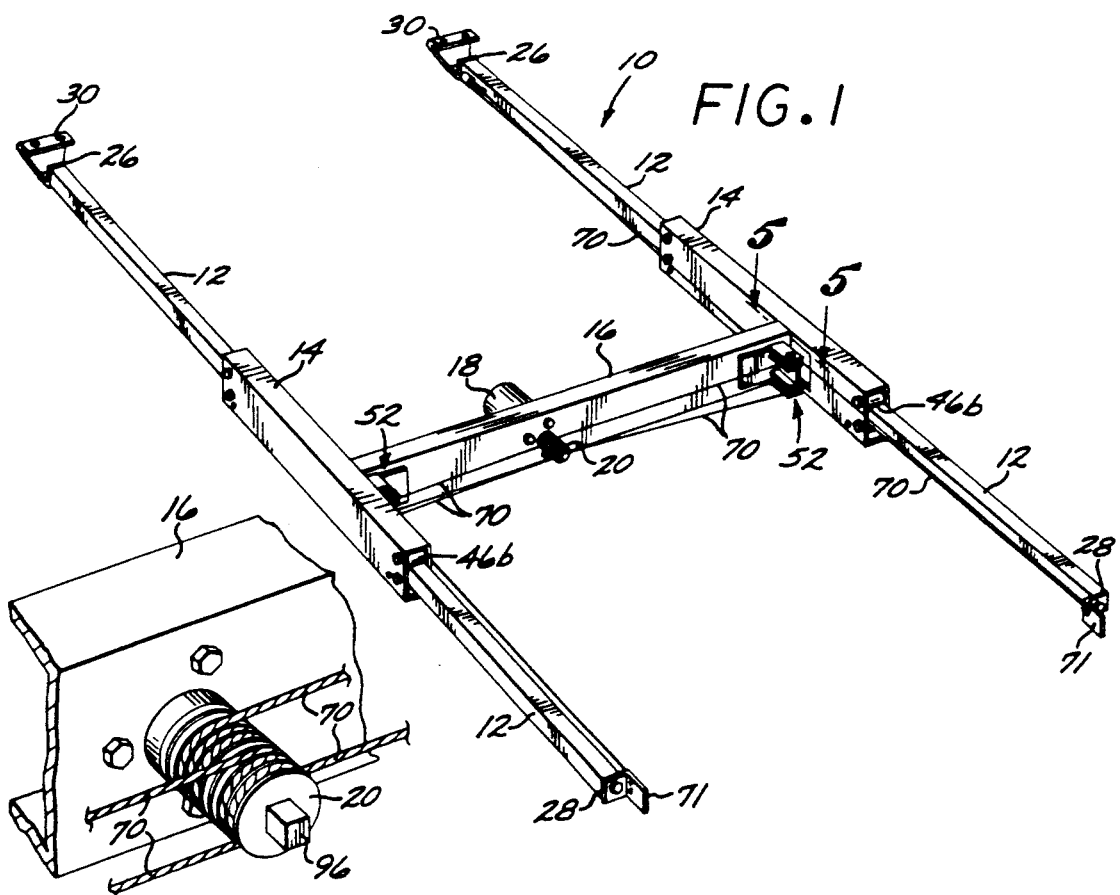
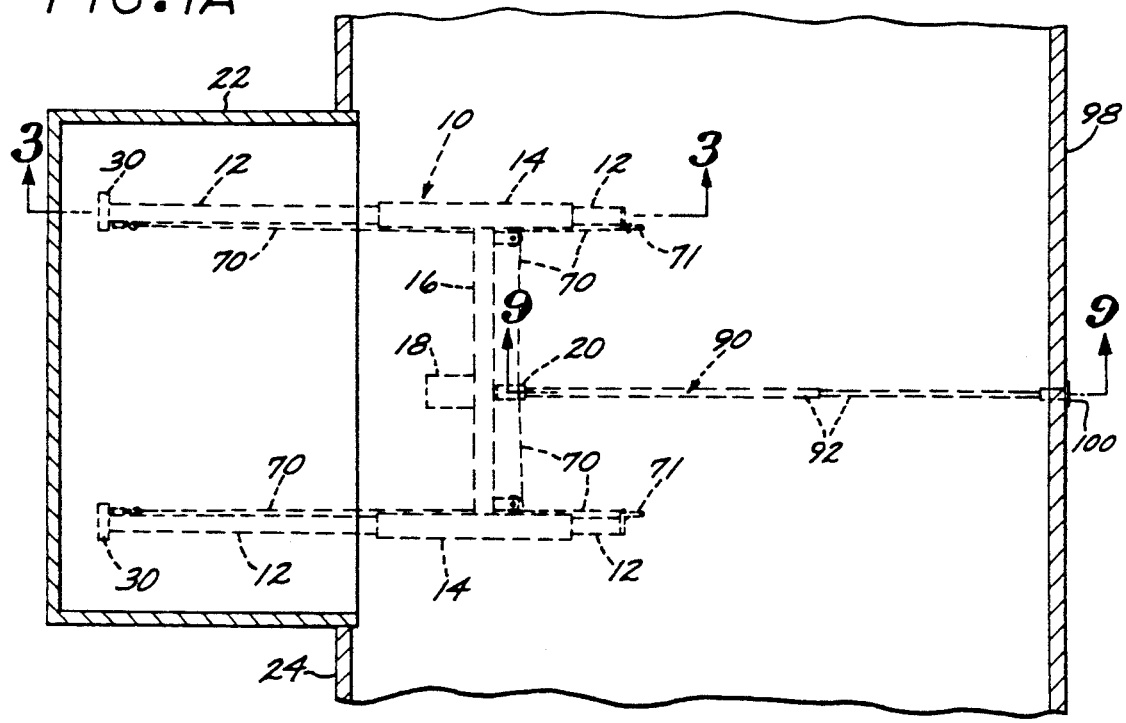

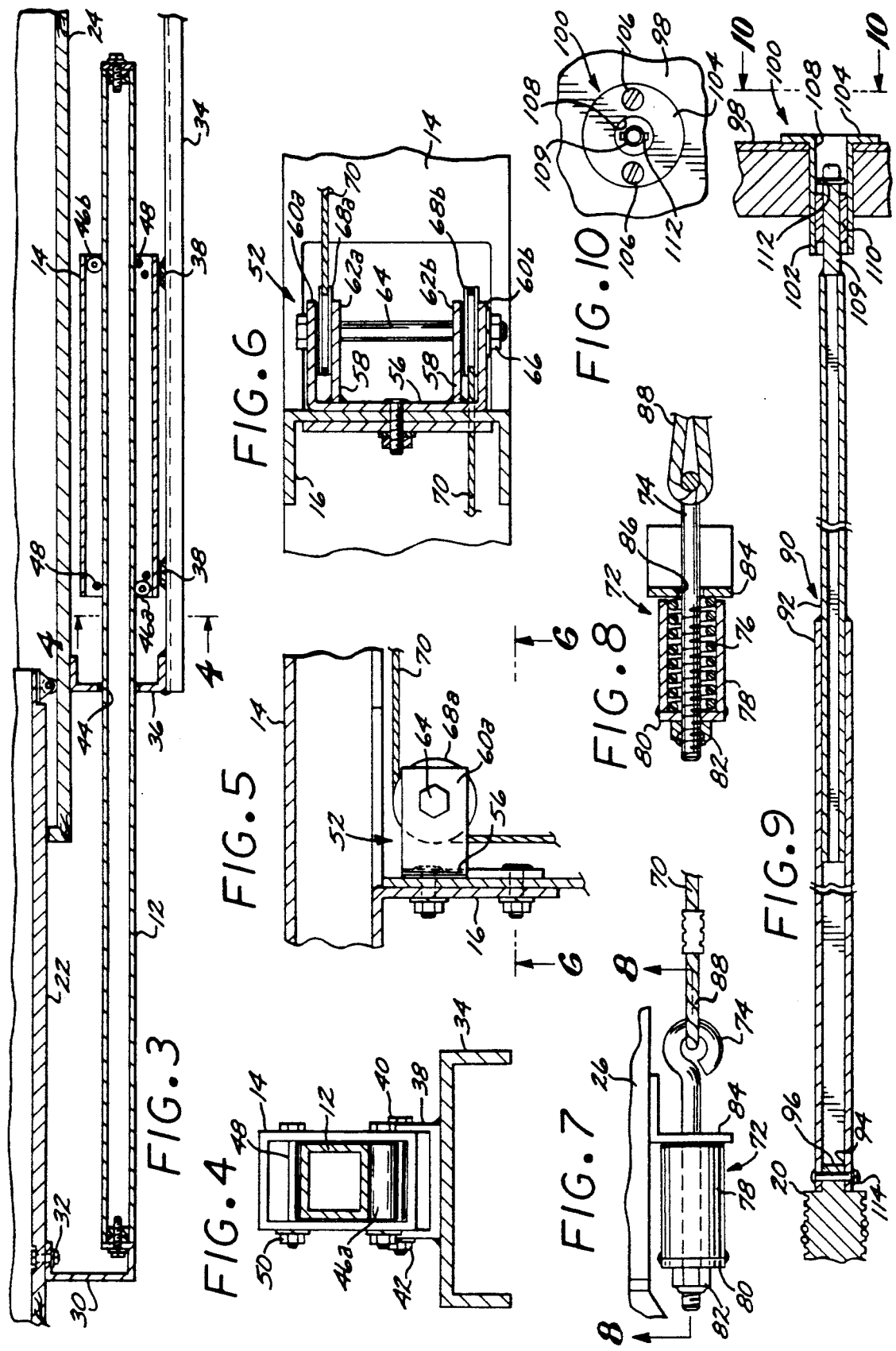

CABLE-DRIVEN EXTENSION MECHANISM FOR TRAILER SLIDE-OUT

BACKGROUND OF THE INVENTION

This invention relates to the field of extensions for trailers and the like. More specifically, the present invention relates to an apparatus for selectively extending outwardly and withdrawing a portion of the side of a trailer.

In the field of house trailers that are towed by motor vehicles, it has long been desired to provide a trailer that is relatively compact while it is being towed, but which can be expanded when parked to provide additional room. Numerous arrangements have been employed in the prior art to accomplish this result. For example, U.S. Pat. No. 4,557,518—Maclean et al. discloses a trailer with a pull-out side extension that is supported on bars that slide in and out of channels mounted on the underside of the trailer body. Other examples of trailers that are laterally expandable are disclosed in U.S. Pat. No. 2,581,192—La Fleur and U.S. Pat. No. 2,842,972—Houdart, both of which disclose rack-and-pinion mechanisms to move an extensible trailer body portion.

One common type of mechanism used in the prior art for extending or expanding trailer bodies is a cable and pulley mechanism, typically operated by a motor-driven drum or sheave. For example, U.S. Pat. No. 2,902,312—Ferrera discloses a trailer body comprising a fixed section and a movable section that slides laterally to double the width of the trailer when extended. The movable section has rollers that ride on rails at the front and back of the fixed section. Movement is effected by a cable and pulley mechanism operated by a motor-driven drum.

Other examples of expansible or extensible trailer bodies using cable and pulley mechanisms are disclosed in the following U.S. Pat. No. 1,471,549—Clement; U.S. Pat. No. 2,147,892—Gray; U.S. Pat. No. 3,482,716—Leadley; U.S. Pat. No. 3,672,238—Young et al.; U.S. Pat. No. 4,192,544—Patterson; and U.S. Pat. No. 4,270,791—Tann.

A relatively recent development in this field is the "slide-out" type of trailer extension, wherein an extensible portion of the side of the trailer body is carried on a pair of rails that are mounted for linear translation in a pair of hollow tubes or channels that are fixed to the bottom of the trailer body. In the prior art slide-out extension, the channels are joined by a first transverse member, on which is mounted an electric motor, and the rails are joined at one end by a second transverse member. The motor is connected to the second transverse member by an elongate drive screw, whereby rotation of the screw in a first direction pulls the rails outwardly from the channels to extend the slide-out portion, and rotation in the opposite direction pulls the rails into the channels to withdraw the slide-out portion back into the main portion of the trailer body.

While some of the prior art trailer extension and expansion devices have yielded satisfactory results, most have demonstrated a number of shortcomings. For example, most of the prior art devices must be installed at the time the trailer is manufactured, and cannot readily be adapted for retrofitting existing trailers. In addition, many of the prior art devices are cumbersome or inconvenient to operate, or have proven to be unreliable or noisy. The drive screw-operated extension, while suitable for retrofit applications, can be particularly noisy, and it is subject to binding due to bending of the rails as they are pulled into and out of the channels.

Accordingly, there has been a need for a trailer extension or expansion device that is sturdy and reliable, easily operated, and quiet in operation, and that can be either incorporated into a trailer body during manufacture, or retrofitted onto existing trailer bodies.

SUMMARY OF THE INVENTION

Broadly, the present invention is an extension mechanism for a trailer slide-out, comprising a pair of parallel rails that are slidably carried in a pair of parallel hollow tubes or channels fixed to the underside of the main portion of the trailer body, wherein the rails, on which the slide-out is mounted, are translated longitudinally through the channels by a cable and pulley mechanism for selectively extending and withdrawing the slide-out.

More specifically, the channels are joined by a transverse structural member, on which is mounted an electric motor that drives a rotatable drum or sheave, also mounted on the transverse member. Wrapped around the sheave are a pair of cables, each of which has its ends attached to opposite ends of one of the rails, so that each rail is translated through its associated channel by its own cable. Each cable passes from a first end of the rail, through an upper pulley mounted adjacent the juncture between one of the channels and the transverse member, and then around the sheave and through a lower pulley, mounted in alignment with and below the upper pulley, and finally to the other end of the rail. This arrangement substantially prevents bending moments or torque from being applied to the rails as they are translated through the channels, thereby minimizing the possibility of binding due to the bending of the rails within the channels.

Rotation of the sheave by the motor in a first direction causes the cables to pull the rails outwardly from the channels, thereby extending the extensible trailer body portion. Rotation of the sheave in the opposite direction causes the cable to pull the rails inwardly into the channels, thereby withdrawing the extensible portion back into the main part of the trailer body.

The present invention incorporates several advantageous features. For example, the rails are mounted within the channels on roller bearings for smoothness and reliability of operation. The motor can advantageously be a low current (e.g., approximately 10 amp), 12 volt reversible motor that can turn at relatively low speeds for quiet operation. A hand crank mechanism is included for manual rotation of the sheave if the motor is inoperative. Each of the cables is preferably anchored to one end of each rail through a compression spring mechanism that maintains a substantially constant cable tension, even if the cable stretches, to minimize slippage around the sheave.

The present invention offers a number of significant advantages over the prior art. For example, the present invention is well-adapted for retrofitting onto existing trailers, offering relatively easy installation. It is quiet in operation, and it is reliable, not being prone to jamming or binding. It is capable of high speed operation, even with a low power motor. Furthermore, the extension mechanism requires a minimum number of load-bearing members, substantially all of the weight of the extended trailer portion being borne by the extended rails and the chassis of the trailer. These and other advantages will be more fully appreciated from the detailed description that follows.

BRIEF DESCRIPTION OF THE DRAWINGS

FIG. 1 of the slide-out extension mechanism in accordance with a preferred embodiment of the present invention;

FIG. 1A is a detailed view of the sheave used in the embodiment of FIG. 1;

FIG. 2 is a plan view of a portion of the bottom of a trailer having a slide-out incorporating the extension mechanism of FIG. 1, wherein the extension mechanism is shown in phantom outline;

FIG. 3 is a cross-sectional view taken along line 3—3 of FIG. 2;

FIG. 4 is a cross-sectional view taken along line 4—4 of FIG. 3;

FIG. 5 is a cross-sectional view taken along line 5—5 of FIG. 1;

FIG. 6 is a cross-sectional view taken along line 6—6 of FIG. 5;

FIG. 7 is a detailed view of the cable tensioning mechanism used in the preferred embodiment of the invention;

FIG. 8 is cross-sectional view taken along line 8—8 of FIG. 7;

FIG. 9 is a cross-sectional view taken along line 9—9 of FIG. 2; and

FIG. 10 is a fragmentary elevational view taken along line 10—10 of FIG. 9.

DETAILED DESCRIPTION OF THE PREFERRED EMBODIMENT

Referring first to FIGS. 1, 1A, and 2, a slide-out extension mechanism 10, in accordance with a preferred embodiment of the present invention, comprises a pair of parallel rails 12 slidably carried, by means to be described below, in a pair of hollow parallel tubes or channels 14 for longitudinal translation therethrough. The channels 14 are connected by a transverse structural member 16, on one side of which is mounted an electric motor 18. The motor 18 is a 12 volt reversible motor for operation in the electrical system of a typical trailer. Preferably, the motor 18 is a permanent magnet gear motor, of the type available from BMI, of Elk Grove, Calif., and Fasco, of St. Louis, Mo., among others. This type of motor typically draws relatively little current (usually less than 10 amps in this application), and runs with little noise. The motor 18 drives a drum or sheave 20 that is rotatably mounted on the opposite side of the transverse member 16. In the illustrated embodiment, the sheave 20 is mounted coaxially on the motor shaft (not shown), which extends through the transverse member 16. Alternatively, the sheave can be fixed to a separate shaft that is rotatably mounted on the transverse member 16 and that is driven by the motor shaft through a set of spur gears or the like.

As shown in FIG. 2, a trailer slide-out 22 is a portion of a trailer body 24 that is extensible outwardly from the body to provide additional interior room. The extension mechanism 10 is adapted to be mounted under the body 24 in the following manner, reference being made to FIGS. 2, 3, and 4:

Each of the rails 12 has an outer end 26 and an inner end 28. Attached to the outer end 26 of each rail 12 is a bracket 30. The brackets 30 are adapted for attachment to the underside of the trailer slide-out 22 by suitable anchoring means, such as bolts 32 (FIG. 3). The rails 12 thus provide substantially all of the support for the weight of the slide-out portion 22.

Each of the channels 14 is mounted on a transverse structural member 34 that extends underneath the trailer body between the longitudinal members 36 of the trailer chassis. The transverse member 34 is secured to the longitudinal chassis members (only one of which is shown in FIG. 3) by welding. A pair of U-shaped brackets 38 are welded to each of the transverse members 34, the brackets 38 being spaced apart by a distance slightly less than the length of the channel 14. Each channel 14 is secured near its ends to the brackets 38 on one of the transverse members 34, using anchoring means such as bolts 40 and nuts 42 (FIG. 4). As shown in FIG. 3, the longitudinal chassis member 36 on the side of the body 24 having the slide-out 22 is provided with a pair of apertures 44 (only one of which is shown) to allow the rails 12 to pass through the chassis member 36.

The rails 12 are carried in the channels 14 on rollers 46a and 46b. Preferably, each channel has two rollers: a lower roller 46a at the outer end of the channel; and an upper roller 46b at the inner end of the channel. Bolts 48, secured by nuts 50, may be used at each end of the channel to maintain the rail in contact with its associated rollers.

Secured to the inner side of the transverse member 34 near each of its junctures with the channels 14 is a pulley mount 52. Each pulley mount 52 comprises a vertically-oriented U-shaped bracket 56 and a retention member 58 welded to the vertical portion of the bracket 56. The bracket 56 has upper and lower horizontal portions 60a and 60b, respectively, and the retention member 58 has upper and lower horizontal flanges 62a and 62b, respectively, that are vertically spaced from the upper and lower horizontal bracket portions 60a and 60b. The upper and lower bracket portions 60a and 60b and the upper and lower flanges 62a and 62b have apertures in alignment, through which is installed vertical axle means 64, which may be provided by a bolt secured by a nut 66. Rotatably carried on the axle means 64 are an upper pulley 68a and a lower pulley 68b, preferably mounted in tandem so as to be vertically aligned. The upper pulley 68a is located on the axle means between the upper horizontal bracket portion 60 and the upper flange 62a, and the lower pulley 68b is located between the lower horizontal bracket portion 60b and the lower flange 62b.

Referring once again to FIGS. 1 and 1A, a pair of cables 70 are wrapped around the sheave 20. The sheave 20 preferably has a helical groove to minimize axial slippage of the cables 70. One end of each cable 70 is connected to a cable anchor member 71, fixed to the inner end 28 of each of the rails 12, and the other end of each cable is connected to the outer end 26 of the same rail, by means to be described below. Thus, one cable is connected to opposite ends of the left rail, and the other cable is connected to opposite ends of the right rail. From the inner end 28 of the rail, the cable passes around the upper pulley 68a adjacent that rail, then wraps around the sheave 20 (preferably at least two full turns). From the sheave 20, the cable extends back to the outer end 26 of the same rail, passing around the lower pulley 68b. Thus, the pulleys provide support for the cables, and change the direction of cable travel from substantially transverse to the channels to substantially parallel to the rails.

In operation, the sheave 20 is rotated by the motor selectively in either of two directions. The cables 70, in conjunction with the pulleys 68a and 68b, translate the rotational motion of the sheave 20 into linear, longitudinal motion of the rails 12. Thus, when the sheave 20 is rotated in a first direction, the rails 12 are pulled in the outward direction (as seen from the trailer body) by the cables 70, thereby extending the slide-out 22 outwardly from the body 24, to the position shown in FIGS. 2 and 3. When the sheave is rotated in the second direction, the rails are pulled in the inward direction, thereby withdrawing the slide-out 22 back into the body 24.

A uniquely advantageous feature of the present invention is shown in FIGS. 7 and 8. The cables 70 are attached to the outer ends 26 of the rails 12 by slack-compensating attachment means 72, comprising an elongate eye-bolt 74 extending coaxially through a coil spring 76 that is enclosed within a tubular spring housing 78, the axial dimension of which is such that the ends of the housing are axially spaced from the ends of the eye-bolt 74. The outer end of each of the housings 78 is sealed with an end cap 80 having a central aperture through which the threaded end of the eye-bolt 74 passes. The eye-bolt 74 is secured within the housing 78 by a hex-nut 82 that fastens the threaded end of the eye-bolt 74 to the end cap 80. The inner end of the housing 78 bears against one leg of an an angle bracket 84, the other leg of which is fixed to the rail 12. The bracket leg against which the housing 78 engages has an aperture 86 for passage of the eye-bolt 74. The spring 76 is under compression between the end cap 80 and the bracket 84. The end of the cable 70 is formed into a loop 88 that is fastened to the eyelet of the eye-bolt 74.

The cable 70, being under constant tension, may have a tendency to stretch with prolonged usage. Such stretching could yield slack that would result in slippage around the sheave 20. The spring 76, however, being under compression, pushes against the end cap 80, and thus urges the eye-bolt 74 toward the outer end of the rail 12, thereby taking up the slack in the cable 70.

In the event that the motor 18 is inoperable, the slide-out extension mechanism may still be operated manually by means of a crank extension member 90, shown in phantom outline in FIG. 2, and in detail in FIGS. 9 and 10. The crank extension member 90 comprises an elongate rod or shaft 92 having a socket 94 at its distal end. The socket 94 conforms to, and is adapted to receive, a hub 96 extending axially from the sheave 20, as shown in FIG. 1A. The socket 94 and the hub 96 are preferably square, as illustrated, but they may be hexagonal, or some other suitable shape.

The proximal end of the crank extension shaft 92 is accessible through the wall 98 of the trailer body opposite the wall from which the slide-out extends by means of a crank access fitting 100. The crank access fitting 100 comprises a tubular portion 102 installed in a hole in the wall 98, the outer end of the tubular portion 102 being surrounded by an integral annular flange 104. The flange 104 seats against the outside surface of the wall 98, and is secured to the wall 98 by means such as screws 106. The flange 104 surrounds a central aperture 108 that communicates with the tubular portion 102.

The crank extension shaft 92 has a proximal end portion 109 that is received in the tubular portion 102, preferably being journaled therein through an anti-friction sleeve 110, formed of a suitable low-friction polymeric material, such as PTFE, although other durable, low-friction polymers may be used. Extending proximally from the sleeve 110, and accessible through the aperture 108, is a crank engagement element at, or closely adjacent to, the proximal end of the crank extension shaft 92. As shown in the drawings, the crank engagement element comprises a crank engagement pin 112 disposed diametrically through the shaft 92 near its proximal end, with the ends of the pin 112 extending radially outwardly from the shaft. The exposed ends of the pin 112 are adapted for engagement by a hand crank (not shown), of a type well-known in the art. Alternatively, the crank engagement member may be a hexagonal hub at the end of the shaft 92, adapted for engagement by a conventional lug wrench, of the type used on the lug nuts of a motor vehicle wheel.

As shown in the drawings, the crank extension shaft 94 is permanently installed in the extension mechanism by having its distal end fixed to the sheave hub 96 by a nut-and-bolt assembly 114 or the like, and by having its proximal end installed in the crank access fitting 100. Alternatively, the shaft 94 can be a removable accessory by making its distal end removable from the hub 96, and by suitably modifying the access fitting 100 in ways that will readily suggest themselves to those skilled in the pertinent arts.

From the foregoing description, a number of advantages for the present invention will be appreciated. For example, the cable and pulley mechanism, driven by the sheave 20, is capable of reliable operation, with little or no torque or bending forces being applied to the rails. As a result, the possibility of the rails binding in the channels is reduced to a minimum. The motor-driven sheave allows relatively high speed operation (depending, of course, on motor speed and sheave diameter), with little noise, as compared to, for example, the drive screw mechanisms of the prior art. As previously described, cable slippage around the sheave, due to cable stretching, is minimized, if not substantially eliminated, by the slack-compensating attachment means 72. Furthermore, the present invention is readily adapted for retrofit applications.

While a preferred embodiment of the invention has been described herein, it will be appreciated that a number of modifications and variations will suggest themselves to those skilled in the pertinent arts. Some of these modifications and variations have been discussed above. Other variations may include alternative arrangements for the bearings that support the rails in the channels, and alternative arrangements for the pulleys. These and other variations and modifications that may suggest themselves should be considered within the spirit and scope of the present invention, as defined in the claims that follow.

What is claimed is:

1. Apparatus for selectively extending and withdrawing a slide-out portion of a trailer body, comprising:

first and second substantially parallel hollow channel members mounted on the underside of the trailer body;

first and second substantially parallel rails slidably supported in the first and second channel members, respectively, for longitudinal translation therein, each of the rails having an outer end and an inner end, the outer end including means for attachment to the slide-out portion;

a transverse structural member connecting the channel members;

a sheave rotatably mounted on the structural member between the channel members;

drive means for selectively driving the sheave to rotate in first and second directions.

first pulley means located adjacent the juncture between the first channel member and the structural member;
second pulley means located adjacent the juncture between the second channel member and the structural member;
a first cable wrapped around the sheave and passing through the first pulley means and having a first end attached to the outer end of the first rail and a second end attached to the inner end of the first rail; and
a second cable wrapped around the sheave and passing through the second pulley means and having a first end attached to the outer end of the second rail and a second end attached to the inner end of the second rail;
whereby the rotation of the sheave in the first direction causes the first and second cables to pull the first and second rails, respectively, in a first longitudinal direction through the first and second channel members, respectively, and the rotation of the sheave in the second direction causes the first and second cables to pull the first and second rails, respectively, in a second longitudinal direction through the first and second channel members, respectively.

2. The apparatus of claim 1, wherein the drive means includes a reversible electric motor coupled to the sheave.

3. The apparatus of claim 1, wherein the drive means includes a shaft having a first end coupled to the sheave and a second end having means for engagement by a hand crank.

4. The apparatus of claim 1, wherein the first pulley means comprises a first upper pulley and a first lower pulley, and wherein the second pulley means comprises a second upper pulley and a second lower pulley.

5. The apparatus of claim 4, wherein the first cable passes from the inner end of the first rail, through the first upper pulley, around the sheave, through the first lower pulley, and to the outer end of the first rail; and
wherein the second cable passes from the inner end of the second rail, through the second upper pulley, around the sheave, through the second lower pulley, and to the outer end of the second rail.

6. The apparatus of claim 1, further comprising slack compensation means, attached between the first end of each of the cables and the outer end of the respective rail to which each cable is attached, for taking up slack in the cable resulting from cable stretch.

7. The apparatus of claim 6, wherein the slack compensation means comprises:
an elongate member having a first end attached to the cable, and a second end;
a coil spring disposed coaxially around the elongate member;
first means for placing the spring under compression; and
second means for securing the second end of the elongate member to the first means.

8. The apparatus of claim 7, wherein the first means comprises:
a tubular housing surrounding the spring and having a first end axially spaced from the first end of the elongate member and a second end axially spaced from the second end of the elongate member;
an end cap attached to the second end of the tubular housing and having an aperture through which the second end of the elongate member passes; and
a bracket having a first portion secured to the rail near the outer end thereof and a second portion engaged against the first end of the tubular housing, the second bracket portion having an aperture through which the elongate member passes.

9. The apparatus of claim 8, wherein the first end of the elongate member has an eyelet to which the cable is attached, wherein the second end of the elongate member is threaded, and wherein the second means includes a nut, threaded onto the second end, that secures the second end of the elongate member to the end cap.

10. Apparatus for selectively extending and withdrawing a slide-out portion of a trailer body, comprising:
channel means mounted on the underside of the trailer body, the channel means comprising first and second substantially parallel channels;
a transverse structural member connecting the first and second channels;
rail means for supporting the slide-out portion, slidably carried within the channel means for longitudinal movement therethrough between an extended position and a withdrawn position, the rail means comprising a first rail slidably carried within the first channel and a second rail slidably carried within the second channel, each of the rails having an inner end and an outer end;
attachment means on the outer end of each of the rails for attachment to the underside of the slide-out portion;
a rotatable sheave rotatably mounted on the transverse structural member;
drive means for selectively rotating the sheave in first and second directions;
pulley means disposed adjacent to the channel means; and
cable means, operatively connecting the sheave and the rail means through the pulley means, for translating the rotational motion of the sheave into longitudinal motion of the rail means, whereby rotation of the sheave in the first direction moves the rail means from the the withdrawn position to the extended position, and rotation of the sheave in the second direction moves the rail means from the extended position to the withdrawn position.

11. Apparatus for selectively extending and withdrawing a slide-out portion of a trailer body, comprising:
channel means mounted on the underside of the trailer body;
rail means for supporting the slide-out portion, slidably carried within the channel means for longitudinal movement therethrough between an extended position and a withdrawn position, and having an outer end and an inner end;
attachment means on the outer end of the rail means for attachment to the underside of the slide-out portion;
a rotatable sheave;
drive means for selectively rotating the sheave in first and second directions, the drive means including a shaft having a first end coupled to the sheave, and a second end having means for engagement by a hand crank;

pulley means disposed adjacent to the channel means; and cable means, operatively connecting the sheave and the rail means through the pulley means, for translating the rotational motion of the sheave into longitudinal motion of the rail means, whereby rotation of the sheave in the first direction moves the rail means from the withdrawn position to the extended position, and rotation of the sheave in the second direction moves the rail means from the extended position to the withdrawn position.

12. The apparatus of claim 11, wherein the channel means comprises first and second substantially parallel channels, and wherein the rail means comprises a first rail slidably carried within the first channel and a second rail slidably carried within the second channel, each of the rails having an inner end and an outer end.

13. The apparatus of claim 12, further comprising a transverse structural member connecting the first and second channels.

14. The apparatus of claim 13, wherein the sheave is rotatably mounted on the structural member.

15. The apparatus of claim 10, wherein the drive means includes a reversible electric motor coupled to the sheave.

16. The apparatus of claim 10, wherein the drive means includes a shaft having a first end coupled to the sheave, and a second end having means for engagement by a hand crank.

17. The apparatus of claim 10, further comprising slack compensation means, attached between the cable means and one end of the rail means, for taking up slack in the cable means resulting from stretching of the cable means.

18. The apparatus of claim 17, wherein the slack compensation means comprises:

an elongate member having a first end attached to the cable means, and a second end;

a coil spring disposed coaxially around the elongate member;

first means for placing the spring under compression; and second means for securing the second end of the elongate member to the first means.

19. The apparatus of claim 18, wherein the first means comprises:

a tubular housing surrounding the spring and having a first end axially spaced from the first end of the elongate member and a second end axially spaced from the second end of the elongate member;

an end cap attached to the second end of the tubular housing and having an aperture through which the second end of the elongate member passes; and a bracket having a first portion secured to the rail means near the outer end thereof and a second portion engaged against the first end of the tubular housing, the second bracket portion having an aperture through which the elongate member passes.

20. The apparatus of claim 19, wherein the first end of the elongate member has an eyelet to which the cable means is attached, wherein the second end of the elongate member is threaded, and wherein the second means includes a nut, threaded onto the second end, that secures the second end of the elongate member to the end cap.

21. The apparatus of claim 10, wherein the pulley means comprises first pulley means located adjacent the first channel and second pulley means located adjacent the second channel, and wherein the cable means comprises:

a first cable having a first end attached to the outer end of the first rail, the first cable then passing through the first pulley means, around the sheave, then again through the first pulley means, to the inner end of the first rail, the first cable having a second end attached to the inner end of the first rail; and a second cable having a first end attached to the outer end of the second rail, the second cable then passing through the second pulley means, around the sheave, then again through the second pulley means, to the inner end of the second rail, the second cable having a second end attached to the inner end of the second rail.

22. Apparatus for selectively extending and withdrawing a slide-out portion of a trailer body, comprising:

first and second substantially parallel hollow channel members mounted on the underside of the trailer body first and second substantially parallel rails slidably supported in the first and second channel members, respectively, for longitudinal translation therein, each of the rails having an outer end and an inner end, the outer end including means for attachment to the slide-out portion;

a rotatable sheave;

drive means for selectively driving the sheave to rotate in first and second directions;

first and second vertically-aligned pulleys located adjacent the first channel member;

third and fourth pulleys located adjacent the second channel member;

a first cable having a first end attached to the outer end of the first rail, the first cable then passing through the first pulley, then around the sheave and through the second pulley, and then to the inner end of the first rail, the first cable having a second end attached to the inner end of the first rail; and a second cable having a first end attached to the outer end of the second rail, the second cable then passing through the third pulley, then around the sheave and through the fourth pulley, and then to the inner end of the second rail, the second cable having a second end attached to the inner end of the second rail;

whereby the rotation of the sheave in the first direction causes the first and second cables to pull the first and second rails, respectively, in a first longitudinal direction through the first and second channel members, respectively, and the rotation of the sheave in the second direction causes the first and second cables to pull the first and second rails, respectively, in a second longitudinal direction through the first and second channel members, respectively.

23. The apparatus of claim 22, further comprising slack compensation means for each of the first and second cables, the slack compensation means being attached between one end of the first cable and the adjacent end of the first rail, and between one end of the second cable and the adjacent end of the second rail, for taking up slack in the first and second cables resulting from stretching of the cables.

24. The apparatus of claim 23, wherein the slack compensation means for each cable comprises:
an elongate member having a first end attached to the cable, and a second end;
a coil spring disposed coaxially around the elongate member;
first means for placing the spring under compression; and
second means for securing the second end of the elongate member to the first means.

25. The apparatus of claim 24, wherein the first means comprises:
a tubular housing surrounding the spring and having a first end axially spaced from the first end of the elongate member and a second end axially spaced from the second end of the elongate member;
an end cap attached to the second end of the tubular housing and having an aperture through which the second end of the elongate member passes; and
a bracket having a first portion secured to the rail near the outer end thereof and a second portion engaged against the first end of the tubular housing, the second bracket portion having an aperture through which the elongate member passes.

26. The apparatus of claim 25, wherein the first end of the elongate member has an eyelet to which the cable is attached, wherein the second end of the elongate member is threaded, and wherein the second means includes a nut, threaded onto the second end, that secures the second end of the elongate member to the end cap.

27. Apparatus for selectively extending and withdrawing a slide-out portion of a trailer body, comprising:
rail means, slidably mounted on the underside of the trailer body, for supporting the slide-out portion, the rail means having an inner end and an outer end;
attachment means, on the outer end of the rail means, for attachment to the slide-out portion;
a rotatable sheave;
drive means for selectively rotating the sheave in first and second directions;
cable means, engaging the sheave and attached to the rail means, for translating the rotational movement of the sheave into a linear, longitudinal movement of the rail means between first and second positions, whereby the rotation of the sheave in the first direction moves the rail means from the first position to the second position to extend the slide-out portion from the trailer body, and the rotation of the sheave in the second direction moves the rail means from the second position to the first position to withdraw the slide-out portion into the trailer body; and
slack compensation means, attached between the cable means and one end of the rail means, for taking up slack in the cable means resulting from stretching of the cable means, wherein the slack compensation means comprises:
an elongate member having a first end attached to the cable means, and a second end;
a coil spring disposed coaxially around the elongate member;
first means for placing the spring under compression; ad
second means for securing the second end of the elongate member to the first means.

28. The apparatus of claim 27, wherein the first means comprises:
a tubular housing surrounding the spring and having a first end axially spaced from the first end of the elongate member and a second end axially spaced from the second end of the elongate member;
an end cap attached to the second end of the tubular housing and having an aperture through which the second end of the elongate member passes; and
a bracket having a first portion secured to the rail means near the outer end thereof and a second portion engaged against the first end of the tubular housing, the second bracket portion having an aperture through which the elongate member passes.

29. The apparatus of claim 28, wherein the first end of the elongate member has an eyelet to which the cable means is attached, wherein the second end of the elongate member is threaded, and wherein the second means includes a nut, threaded onto the second end, that secures the second end of the elongate member to the end cap.

30. The apparatus of claim 27, further comprising:
channel means, mounted on the underside of the trailer body, for slidably carrying the rail means for longitudinal movement therethrough.

31. The apparatus of claim 30, wherein the cable means includes a cable wrapped around the sheave and having first and second ends attached to the rail means, at least one of the cable ends being attached to the rail means by the slack compensation means.

32. The apparatus of claim 31, further comprising:
pulley means, operatively mounted adjacent the channel means and supporting the cable, for changing the direction cable travel from substantially transverse to the channel means to substantially parallel to the rail means as the cable passes from the sheave to the rail means.

33. The apparatus of claim 32, wherein the pulley means includes first and second pulleys, and wherein the cable passes from the sheave to the inner end of the rail means through the first pulley, and from the sheave to the outer end of the rail means through the second pulley.

34. Apparatus for selectively extending and withdrawing a slide-out portion of a trailer body, comprising:
channel means mounted on the underside of the trailer body;
rail means for supporting the slide-out portion, slidably carried within the channel means for longitudinal movement therethrough between an extended position and a withdrawn position, and having an outer end and an inner end;
attachment means on the outer end of the rail means for attachment to the underside of the slide-out portion;
a rotatable sheave;
drive means for selectively rotating the sheave in first and second directions;
pulley means disposed adjacent to the channel means;
cable means, operatively connecting the sheave and the rail means through the pulley means, for translating the rotational motion of the sheave into longitudinal motion of the rail means, whereby rotation of the sheave in the first direction moves the rail means from the withdrawn position to the extended position, and rotation of the sheave in the second direction moves the rail means from the extended position to the withdrawn position; and slack compensation means, attached between the cable means and one end of the rail means, for taking up slack in the cable means resulting from stretching of the cable means, wherein the slack compensation means comprises:

an elongate member having a first end attached to the cable means, and a second end;

a coil spring disposed coaxially around the elongate member;

first means for placing the spring under compression; and second means for securing the second end of the elongate member to the first means.

35. Apparatus for selectively extending and withdrawing a slide-out portion of a trailer body, comprising:

channel means mounted on the underside of the trailer body, the channel means comprising first and second substantially parallel channels;

rail means for supporting the slide-out portion, slidably carried within the channel means for longitudinal movement therethrough between an extended position and a withdrawn position, the rail means comprising a first rail slidably carried within the first channel and a second rail slidably carried within the second channel, each of the rails having an inner end and an outer end;

attachment means on the outer end of each of the rails for attachment to the underside of the slide-out portion;

a rotatable sheave;

drive means for selectively rotating the sheave in first and second directions;

first and second pulley means respectively located adjacent the first and second channels; and cable means, operatively connecting the sheave and the rail means through the pulley means, for translating the rotational motion of the sheave into longitudinal motion of the rail means, whereby rotation of the sheave in the first direction moves the rail means from the withdrawn position to the extended position, and rotation of the sheave in the second direction moves the rail means from the extended position to the withdrawn position, the cable means comprising:

a first cable having a first end attached to the outer end of the first rail, the first cable then passing through the first pulley means, around the sheave, then again through the first pulley means, to the inner end of the first rail, the first cable having a second end attached to the inner end of the first rail; and a second cable having a first end attached to the outer end of the second rail, the second cable then passing through the second pulley means, around the sheave, then again through the second pulley means, to the inner end of the second rail, the second cable having a second end attached to the inner end of the second rail.

* * * * *